United States Patent
Kiffmeier et al.

(10) Patent No.: US 7,756,686 B2
(45) Date of Patent: Jul. 13, 2010

(54) PROCESS AND MEANS FOR BLOCK-BASED MODELING

(75) Inventors: Ulrich Kiffmeier, Harsewinkel (DE); Ulrich Louis, Paderborn (DE)

(73) Assignee: dSPACE digital signal processing and control enineering GmbH, Paderborn (DE)

( * ) Notice: Subject to any disclaimer, the term of this patent is extended or adjusted under 35 U.S.C. 154(b) by 1028 days.

(21) Appl. No.: 11/424,582

(22) Filed: Jun. 16, 2006

(65) Prior Publication Data

US 2007/0016395 A1    Jan. 18, 2007

Related U.S. Application Data

(63) Continuation-in-part of application No. 11/208,588, filed on Aug. 23, 2005, now Pat. No. 7,469,201.

(30) Foreign Application Priority Data

Jun. 17, 2005    (DE) .................... 10 2005 028 045

(51) Int. Cl.
  *G06F 17/50* (2006.01)
  *G06F 13/00* (2006.01)
(52) U.S. Cl. ............................ 703/2; 703/28; 716/12; 710/300
(58) Field of Classification Search ............... 703/2, 703/1, 28; 710/300; 716/12
  See application file for complete search history.

(56) References Cited

U.S. PATENT DOCUMENTS

| | | | | |
|---|---|---|---|---|
| 4,777,615 A | * | 10/1988 | Potash | 710/300 |
| 6,426,771 B1 | * | 7/2002 | Kosugi | 348/222.1 |
| 2004/0215773 A1 | * | 10/2004 | Strait et al. | 709/225 |
| 2006/0117067 A1 | * | 6/2006 | Wright et al. | 707/104.1 |

OTHER PUBLICATIONS

The Math Works, Inc., Simulink Simulation and Model-Based Design, Version 6, Jun. 2004, pp. 1-1-4-23.
The Math Works, Inc., XPC Target, for Use With Real-Time Workshop, I/O Reference Guide, Version 2, Jul. 2002, pp. 1-1-1-21.
The Math Works, Inc., XPC Target, for Use With Real-Time Workshop, Getting Started, Version 2, Jul. 2002, pp. 1-1-2-4.

* cited by examiner

*Primary Examiner*—Thai Phan
(74) *Attorney, Agent, or Firm*—David S. Safran; Roberts Mlotkowski Safran & Cole, P.C.

(57) ABSTRACT

A modeling system and process for computer-aided, block-based modeling by preparing a first block diagram in a first model plane that relates to a first abstraction stage, in which at least one block is placeable in the first model plane and several blocks are connectable to one another by horizontal data transfer devices for horizontally exchanging data. At least one other block diagram is arrangeable on at least one other model plane assigned to the first abstraction stage that is separated from the first model plane. The first block diagram of the first model plane and the other block diagram of the other model plane form an overall block diagram that can be arranged on a selection of at least two model planes from the first model plane and the other model planes, so that a vertical exchange of data between at least two selected model planes can be produced.

10 Claims, 11 Drawing Sheets

PROCESS AND MEANS FOR BLOCK-BASED MODELING

CROSS-REFERENCE TO RELATED APPLICATION

This application is a continuation-in-part of U.S. patent application Ser. No. 11/208,588.

BACKGROUND OF THE INVENTION

1. Field of Invention

The invention relates to a process for computer-aided, block-based modeling, to prepare a first block diagram in a first model plane—of a first abstraction stage—there being at least one block, and for horizontal exchange of data between several blocks, the blocks being able to be connected to one another by horizontal data transfer means. Moreover, the invention also relates to a modeling means for preparing a first block diagram in a first model plane—of a first abstraction stage—and there can be at least one block in the first model plane, and for horizontal exchange of data, several blocks being connectable to one another by horizontal data transfer means.

2. Description of Related Art

Computer-aided processes and modeling means for block-based modeling, for the purposes of this invention, in the area of technical research and development, have the objective of mathematically mapping and representing any type of process and simulating it by using numerical methods. The probably most common means for executing this modeling is a block diagram representation known mainly from system theory, in which the blocks used acquire a certain mathematical functionality—from simple algebraic operations to complex dynamic timing—and processes of almost any complexity can be modeled by a block diagram by interconnection of different blocks in terms of signals.

This process is conventionally carried out on computer-aided modeling means, the mathematical modeling of a technical-physical process itself often being only the first step of a plurality of development steps, as can be found, for example, in the area of the development and use of electronic control systems or electronic control units.

It is helpful to an understanding of the invention to briefly outline the typical working process in handling of computer-aided modeling processes and the modeling means directed at them. In this respect, reference is made, by way of example, to the aforementioned use of electronic control units, which use is especially well suited because it shows the diverse requirements for the modeling processes under consideration here (keyword "V-cycle"); of course, the modeling processes are not limited to this application which is used only as an example.

In practice, preparation of a mathematical model of any technical process is not an end in itself which is used purely to acquire knowledge, rather the acquired process should generally be subjected to planned control, control being defined here not only as what is defined in a system theoretical sense narrowly as control, but any type of planned influence, for example, also by feedback control.

Within the framework of so-called function development, therefore, the block diagram which describes the process to be influenced is used and a control modeled in the form of a block diagram is added to it so that the effect of control on the process within the framework of numerical simulation—without a physical connection to the real process—can be safely observed and the control can be adapted. This model or block diagram is, first of all, abstract, i.e., without any reference to a possible hardware implementation and without reference to possible linkage of the control to a real process; it is called a function model below.

To test the control concept which has been tried with the function model in a real process, by so-called rapid control prototyping, the block diagram, or parts of it, is translated by the modeling environment automatically into a control program which can run on the target hardware—conventionally an electronic control unit. This electronic control unit is integrated via its outside world interfaces into the real physical process, and accepts the states of the process to be influenced which are of interest via its outside world interfaces and outputs the corresponding influence quantities—manipulated variables—over these interfaces to the process.

At this point, it is immediately obvious that, when the control program is produced, the special target hardware together with its outside world interfaces must always be considered in order to obtain a control program which can run on this target hardware. For this reason, the target hardware and its outside world interfaces are already considered in the modeling by the properties of the electronic control unit being represented by hardware blocks and integrated into the existing abstract function model. The overall block diagram which has been prepared in this way accordingly comprises not only the function model, but also a hardware model or hardware block diagram which is associated with the function model.

Since the hardware blocks which describe the hardware represent entirely different hardware properties, they may describe entire I/O devices or components of them (for example, channels of digital/analog converters, digital I/O channels) as well as complex, parameterizable modules (for example, data busses and definition of the messages transmitted by them and their timing behavior, generation/analysis of signal characteristics by digital signal processors), the properties of which can be set in the block diagram, for example, by dialog windows or similar means.

The described computer-aided modeling processes or modeling means are known from the prior art. The modeling means MATLAB and Simulink (TheMathWorks: "MATLAB, The Language of Technical Computing", version 7.0.4, March 2005, or TheMathWorks: "Simulink, Simulation and Model-Based Design", version 6.2, March 2005) allows execution of a block-based modeling process which allows the arrangement of blocks which form a block diagram in a first and sole model plane, this first and sole model plane being assigned to a first highest abstraction stage. This means that the complete model is present as an overall block diagram in a first and sole model plane and is not, for example, distributed among different model planes of the same first abstraction stage.

Such an overall block diagram known from the prior art can have other model planes, but these other model planes belong to another, lower abstraction stage, i.e., they constitute a part of the overall block diagram which is at the higher abstraction stage and which is located on the first model plane in a higher degree of detail and on a model plane of a lower abstraction stage than the first abstraction stage. Therefore, the model planes of a lower abstraction stage, in fact, do not deliver any new contribution to the overall block diagram, but instead represent a component which already exists in the block diagram of the first model plane of the first and highest abstraction stage, only in another, more detailed form.

In the prior art, this is accomplished, for example, by sub-block diagram blocks which are located, for example, in the first and sole model plane of the first abstraction stage; such a block could represent, for example, a PID controller. This sub-block diagram block represents nothing more than a block diagram in another model plane which is assigned in any case to a lower abstraction stage. Such a sub-block diagram block which is located in the first model plane of the first abstraction stage would have, for example, only one block input and one block output, but it would not yield any further information about its internal implementation.

The internal structure of the sub-block diagram block is only disclosed by another block diagram in another model plane of a lower abstraction stage which is represented by the sub-block diagram block in the first model plane of the first abstraction stage. In this further model plane of a lower abstraction stage, for example, it could be shown or mathematically modeled by another block diagram that the PID controller is implemented by amplification, integration and differentiation of an input signal, the cumulative value of these three signal transforms then being output.

Moreover, the possibility of using sub-block diagram blocks, in turn, in sub-block diagram model planes is known, and they in turn represent sub-block diagram model planes of a still lower abstraction stage or sub-block diagrams in these sub-block diagram model planes.

The described procedure in the known computer-aided and block-based modeling with respect to support of efficient working sequences, transparency, ability to structure and adapt models has various disadvantages. Because in the known processes and in the known modeling means for block-based modeling the overall block diagram is modeled completely in a first model plane of a first abstraction stage, meaningful functional organization and structuring of the block diagram are possible only to a limited degree; all components of the block diagram always appear with equal rights. For this reason, treatment based on division of labor and organization of the block diagram are not possible in an optimum manner.

Grouping of coherent model parts is possible by the organization element of the sub-block diagram blocks and the sub-block diagram model planes associated with them, but there is the danger of increasing confusion within the overall block diagram, since the usage of nested sub-block diagram blocks creates a labyrinthine interleaving of the overall block diagram. Mainly with consideration of the fact that many of the blocks used in practice can be configured and must also be configured for meaningful use of the block diagram in simulation and code generation, and with further consideration of the fact that this configuration is undertaken directly over the block (for example, by a dialog window being opened upon activation—"double click"—of the block for input of parameters or by the block's having diverse block inputs via which parameterization can be undertaken by external interconnection to other blocks), it is immediately apparent that reconfiguration of block properties for large models is a time-consuming and error-prone task. This applies more, the further it is considered that the models of more demanding processes or systems can easily comprise several hundred thousand blocks and more.

A similar problem arises in a case which can be encountered in practice in which the model or the block diagram must be adapted to partially or completely altered target hardware. In this case, in the process know from the prior art or using the known modeling means, the existing hardware-describing blocks must be exchanged and replaced by new blocks which described the new target hardware (for example, TheMathWorks: "xPC Target, For Use With Real-Time Workshop", User's Guide, version II, March 2005).

In the known modeling processes and modeling means underlying the invention, handling and organization of modifications of a model or block diagram are of major importance to the user. Modifications constitute alternative versions of a block diagram which generally must be managed separately; this is complex and entails the danger of divergent and inconsistent model lines. It is known from the field of electronic circuit design that these alternative model parts can be accommodated and managed in the same model plane, the unactivated model part—therefore the unactivated alternative version—is represented concealed or "grayed-out" (Electronics Workbench: "Multisim 8. User Guide". December 2004").

SUMMARY OF THE INVENTION

A primary object of this invention is thus to embody and develop a modeling means for computer-aided preparation of a block diagram and a process aimed thereat such that the aforementioned disadvantages are at least partially avoided.

The modeling means of the invention in which the aforementioned object is achieved is essentially characterized, first of all, in that at least one other block diagram can be arranged on at least one other model plane which is assigned to the first abstraction stage and which is separated from the first model plane, so that the first block diagram of the first model plane and the other block diagram of the other model plane form an overall block diagram, and that by means of corresponding vertical data transfer means which can be arranged on a selection of at least two model planes from the first model plane and the other model planes, a vertical exchange of data between at least two selected model planes can be produced.

Because the modeling means in accordance with the invention offers the possibility of the entire model or block diagram extending not only to the first model plane of a first abstraction stage, but also to other model planes which belong exactly to the same first abstraction stage, there is another possibility for structuring the block diagram such that treatment of the model or block diagram based on division of labor and structured organization of the block diagram are advantageously possible.

The first model plane and the other model planes which all belong to the same first abstraction stage form the overall block diagram. The parts of the overall block diagram distributed among these planes is therefore not simply a representation of certain model components on another abstraction stage, but they are complementary model components with equal rights, which are essential for the overall block diagram.

The modeling means makes it possible to arrange blocks in each of the first and other model planes, data exchange between the blocks in one model plane being produced by horizontal data transfer means. In the known block diagram, such a horizontal data transfer means consists conventionally of data lines or signal lines, such a signal line connecting the output of one block to the input of another block. However, a horizontal data transfer means is in no way limited to such an embodiment, but rather constructions are also conceivable which are based, for example, on the corresponding transmitting and receiving stations which are not connected by a line.

Furthermore, the modeling means as according to the invention provides vertical data transfer means with which data can be exchanged between at least two model planes, the model planes belonging to the same first abstraction stage. To do this, the corresponding vertical data transfer means are located on the model planes which represent a choice from the first model plane and the other model planes.

The vertical data transfer means are characterized in that the data can be sent from vertical data transfer means acting as data sources and can be received by the corresponding vertical data transfer means which are acting as data sinks and are kept in readiness or prepared here for further processing.

The terms "horizontal" and "vertical" data transfer means have nothing to do with the actual geometrical direction of the data exchange effected by them. The terms simply support the simplifying idea that data exchange in one model plane, if this model plane is aligned conceptually horizontally, likewise also occurs in this plane, for example, as a result of the signal lines which run in the plane. Of course, the data exchange which is effected by the horizontal data transfer means is, however, not limited to data exchange which is horizontal in a geometrical sense: "horizontal" describes only data exchange in whatever plane.

In an analogous manner, data exchange effected by vertical data transfer means is between different planes which belong to the same abstraction stage. The concept of vertical data exchange simply supports the easily grasped idea that the different model planes of this first abstraction stage are located on top of one another and the vertical data transfer means located on these planes thus cause a vertical data exchange. Of course, it also applies here that vertical data exchange is not limited to the restrictive geometrical idea of a vertical direction but simply describes the data exchange between different model planes of the same abstraction stage, regardless of how these model planes are in fact arranged relative to one another in a representation.

When it is said that the vertical data transfer means act as a data sink or as a data source and the vertical data transfer means acting as the data source send data which can be received by the vertical data transfer means acting as a data sink, it is a description which is oriented to the representation of the model plane and which illustrates the function of data exchange in fact accomplished.

For one skilled in the art, it is apparent that, in the physical sense, nothing needs to be sent and received. The function of data exchange between different model planes can be accomplished using software engineering in different ways. For example, the corresponding vertical data transfer means can be accomplished by a storage location with a certain storage address, "sending" of data being implemented by wrting to the storage location and "receiving" of data being implemented by reading out the storage location determined by the storage address. The corresponding vertical data transfer means can, therefore, coincide in one storage location in the software engineering implementation. Therefore, this invention is not limited to a certain software engineering implementation, in particular, the implementation is dependent essentially on the development environments used, with which the process is carried out or the modeling means is implemented.

There are a host of possibilities for embodying and developing the teachings of the invention. The following remarks relate to special embodiments of the invention.

In one preferred embodiment of the modeling means of the invention, the modeling means finds the vertical data transfer means which correspond to one another and which are located on different model planes of the same abstraction stage by the concurrent geometrical position and assigns them to one another. The geometrical assignment is supported especially by the first model plane and the other model planes being essentially congruent, and thus, geometrical assignment is possible in an especially simple manner.

In addition or alternatively, the modeling means of the invention also preferably offer assignment of the vertical data transfer means which correspond to one another by concurrent identifications. This means that, for example, vertical data transfer means which correspond to one another and which are located on different model planes are provided with concurrent identifications, for example, symbolic names, manually, automatically or supported partially automated by the modeling means.

In another preferred embodiment of the computed-aided modeling means, the vertical data transfer means are made as vertical data transfer blocks. Consequently, they are, like other blocks, also integrated via horizontal data transfer means into the data flow of the block diagrams located on the different model planes.

The vertical data transfer means, which act as data sinks, are made usable by the computed-aided modeling means preferably in two different ways which do not exclude one another. The vertical data transfer means which are provided by the modeling means as data sinks are preferably made such that the data received by them can be picked up via an interface and thus are available on the model plane for further processing, in which the vertical data transfer means acting as a data sink is located. In this case, the vertical data transfer means acting as a data sink works equally as a transmission station for the received signal. Viewed from the model plane in which the vertical data transfer means acting as a data sink is located, it therefore acts at the same time as a source for the data received by it.

Alternatively or in combination, in one preferred embodiment, it is provided that the modeling means provides for a data transfer means which acts as a data sink such that it can be parameterized with the data received from it. This means simply that the vertical data transfer means acting as a data sink uses the received data as such to establish internal properties. Likewise, there is no contradiction herein when the vertical data transfer means acting as a data sink also makes available the received data in addition via an interface, for example, at one output, for further processing. Examples of parameterizable properties are the initial value of an integrator, initial and end values of any I/O devices, bit resolution of D/A converters and countless other properties as are known from abstract and hardware-dependent blocks from block libraries.

In one preferred embodiment, parts of the block diagram to be alternatively executed with the computed-aided modeling means according to the invention can be arranged on different alternative model planes and can be activated or deactivated as necessary.

In another preferred embodiment of the modeling means, for modeling of different operating modes of the model, several model planes are used, these model planes also being assigned to a first, common abstraction stage. This in turn entails the advantage that, with a consistent division of all model parts into the respective operating modes, all properties and model parts of an operating mode are combined in certain model planes and can be coherently influenced there.

In this connection, one preferred embodiment of the modeling means under discussion here comprises the modeling means being able to support at least one of the operating modes, that is initialization, run time and termination, and accordingly, the corresponding parts of the overall block diagram can be modeled separately in an initialization model plane, a run time model plane and/or a termination model plane. It goes without saying that, depending on the requirements, also more than one of these planes can be made available by the modeling means so that there are several simultaneously effective operating mode-model planes of the same type. However, in exactly this way it is also possible—in the sense of a model or block diagram version—to define alternative operating mode model planes which, in turn, can be activated and deactivated.

In consistent, more extensive support of modeling of several operating modes in several operating mode-model planes, a preferred modeling means makes available such blocks which comprise operating mode-partial blocks which correspond to the operating modes and which can be assigned to the model planes of the supported operating modes. Preferably, the operating mode-partial blocks can be automatically assigned by the modeling means to the supported operating mode-model planes. In doing so, the operating mode-partial blocks can preferably also be made as vertical data transfer means. With these operating mode-partial blocks especially an operating mode-partial block which, acting as a data sink, can be parameterized by corresponding operating inode-partial blocks acting as a data source.

Furthermore, an especially preferred embodiment of the modeling means of the invention enables integrated representation of any choice of model planes from the first model plane and the other model planes. Especially, when the first and the other model planes are essentially congruent, and the corresponding vertical data transfer means have been arranged at essentially the same geometrical positions of the different model planes, an integrated representation of the overall block diagram is obtained by placing the model planes on top of one another—so to speak by superposing the block diagrams of the selected model planes.

Furthermore, one preferred embodiment of the modeling means of the invention allows any noncontradictory choice of model planes from the first model plane and the other model planes to be simulated with the modeling means and/or program code which can be executed on certain target hardware to be produced from this choice.

Surprisingly, with the modeling means made according to the invention, a further problem of modeling and simulation technique can be solved, specifically the problem of modeling an article which can change for the run time and the mapping of this dynamic modeling article onto a block operating diagram which is ordinarily of a structurally static nature.

A modeling article which can change for running time means that, during the simulation interval of the mathematical model described by the block operating diagram, the model is structurally changed by elements being added or dropped. These dynamic model changes occur, for example, in models of open systems, such as, for example, in telematic applications in which the population density to be considered is variable; this includes, for example, radar detection systems in aviation, but also in road traffic.

By application of the concept of distributed model formation of an overall block diagram according to the invention on several model planes of the same abstraction stage, the problem of run time-variable model articles can be easily solved.

According to another embodiment of the invention, it is provided that the modeling means makes it possible to arrange at least one meta-block diagram in at least one model plane of the overall block diagram, the meta-block diagram representing a part of the overall block diagram which can be at least easily produced or destroyed for the run time, and from the meta-block diagram for run time at least one instance can be produced and the instance can be arranged in at least one instance model plane.

The meta-block diagram is, consequently, simply a pattern for a certain type of model component (for example, a recognized object in an observation space) which for the run time can be easily or even repeatedly added to the model, but also can be dropped again from the model. The model components in fact being added to the model or dropped from the model are the instances of the meta-block diagram retrieved from this pattern.

This idea of modeling an overall block diagram thus corresponds exactly to the initially described type of model formation of block operating diagrams according to the invention on several model planes of the same abstraction stage, with the sole difference that model parts—the instances to be produced—are not numerically stipulated as fixed, but only according to type by the meta-block diagram. By certain events (for example, entry/exit of an object into/out of an observation space) during the run time of the model the production of an instance—or even several instances—of the meta-block diagram can be initiated in exactly the same manner as the destruction of such an instance.

Fundamentally, this type of modeling with metaobjects and their instances corresponds to the idea of object-based and class-based modeling of an examination article in higher programming languages known from information technology: transposition of the concept to block diagrams which can be simulated and which have variable run time is however unknown.

In one especially advantageous embodiment of the modeling means in accordance with the invention, it is provided that the instance model plane can be produced and destroyed synchronously with the instance of the meta-block diagram for the run time. This makes sense especially when so many instance model planes can be produced and destroyed that each instance of the meta-block diagram produced can be placed in a separate instance model plane.

Another preferred embodiment of the modeling means allows definition of local and/or global data elements in the meta-block diagram, the local data elements coexisting without interactions for each instance model plane separately next to one another and the global data elements for all instance model planes being identical. With which means of modeling technique, the definition of these data elements takes place depends, among others, on the software tool used, with which the modeling means according to the invention or the process according to the invention is implemented.

The modeling means according to the invention allows not only observation of development—origination and deletion—of the instance model planes, but it also allows protocolling of this development for subsequent evaluation of the simulation run.

The invention is not aimed only at a computer-aided modeling means for preparation of a block diagram, but also at the process which is independent of the means for computer-aided, block-based modeling, thus, as it is also carried out by the modeling means in accordance with the invention.

In particular, there are now various possibilities for embodying and developing the modeling means according to the invention and the process of the invention for computer-aided, block-based modeling. In this respect reference is made to the description of preferred embodiments in conjunction with the accompanying drawings.

DETAILED DESCRIPTION OF THE INVENTION

Figure 1:
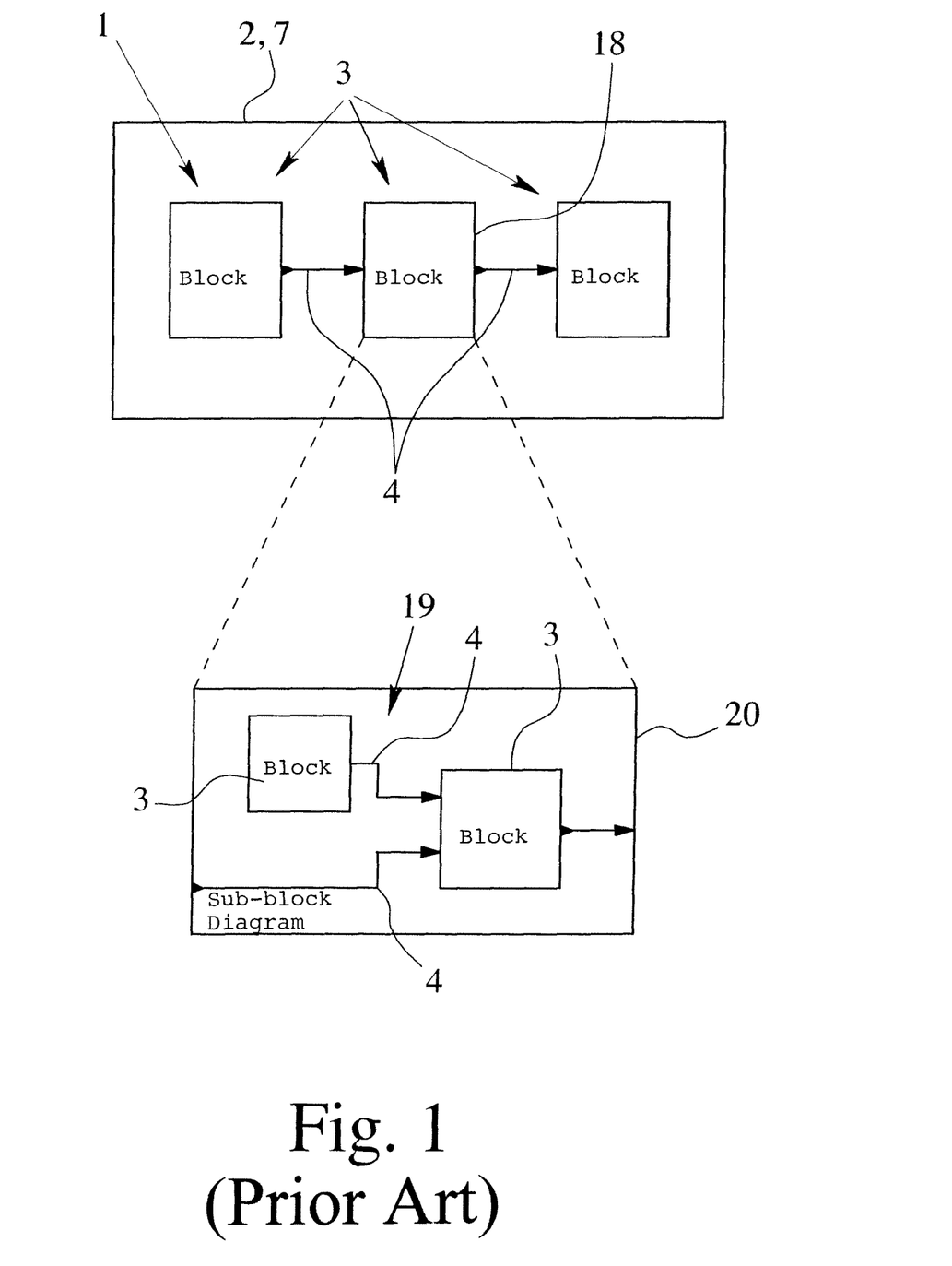
FIG. 1 shows a model or block diagram which has been prepared with a known modeling means and a known process for computer-aided, block-based modeling.

FIG. 1 shows a first block diagram 1 which has been prepared with a modeling means and process known from the prior art. The first block diagram 1 is located in a first model plane 2. As is conventional in block diagrams, the first block diagram 1 is comprised of blocks 3 which are connected by horizontal data transfer means 4 for purposes of data exchange. All important components of the model are contained in the first block diagram 1.

Figure 2:
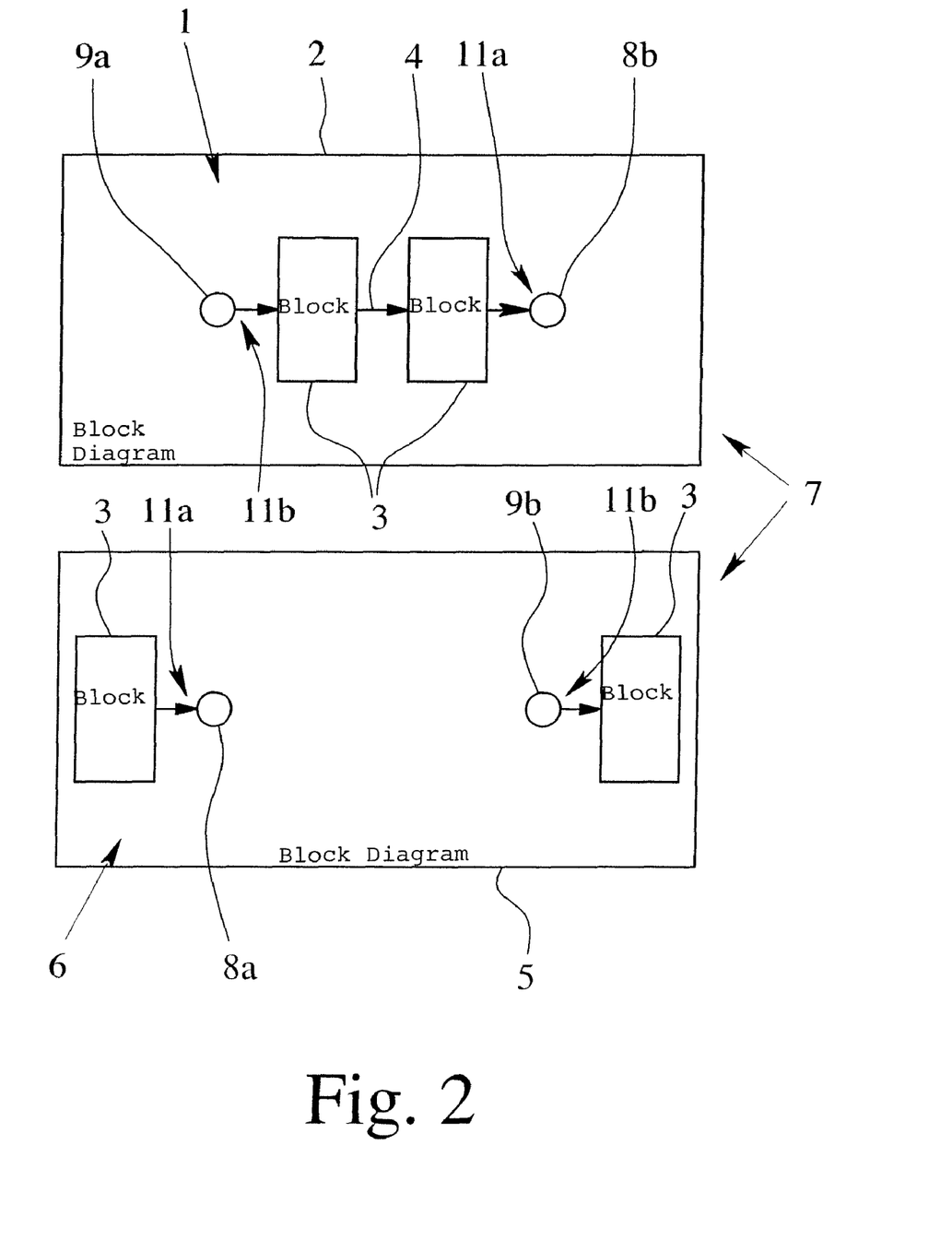
FIG. 2 shows a model or overall block diagram which has been prepared with a preferred embodiment of the modeling means and process in the accordance with the invention.

FIG. 2 shows a preferred embodiment of a block diagram which has been prepared with the modeling means and process in accordance with the invention, and which is located in the first model plane 2 with the first block diagram 1 and in another model plane 5 with another block diagram 6.

In this connection, it is important that the first model plane 2 and the other model plane 5 belong to the same first abstraction stage, i.e., that it is not the first model plane 2 which solely contains an overall block diagram 7, but that the overall block diagram 7 is composed of the first block diagram 1 of the first model plane 2 and another block diagram 6 of the other model plane 5; the first block diagram 1 and the other block diagram 6 are consequently essential components of the overall block diagram 7.

The overall block diagram 7 can be advantageously structured and treated based on a division of labor by the possibility of distributing the overall block diagram 7 among several model planes 2, 5 of the same abstraction stage, which possibility is made available by the modeling means.

In order to be able to exchange data between the first model plane 2 and the second model plane 5, there are corresponding vertical data transfer means 8, 9, extending between the two model planes 2, 5. The corresponding vertical data transfer means 8, 9, act mutually as a data source and data sink. The data sent by the vertical data transfer means 8a, 8b, which acts as the data source, are received by the vertical data transfer means 9a, 9b, which act as the corresponding data sinks, and which are kept in readiness and made available for further processing.

In FIGS. 2, 3, 5 and 6, the corresponding vertical data transfer means 8, 9 are assigned to one another based on concurrent geometrical positions in the model planes 2, 5. In the illustrated embodiments, this assignment takes place automatically by the modeling means. Therefore, in the illustrated embodiments, this geometrical assignment is especially simple since the first model plane 2 and the other model planes 5 are essentially congruent.

Figure 4:
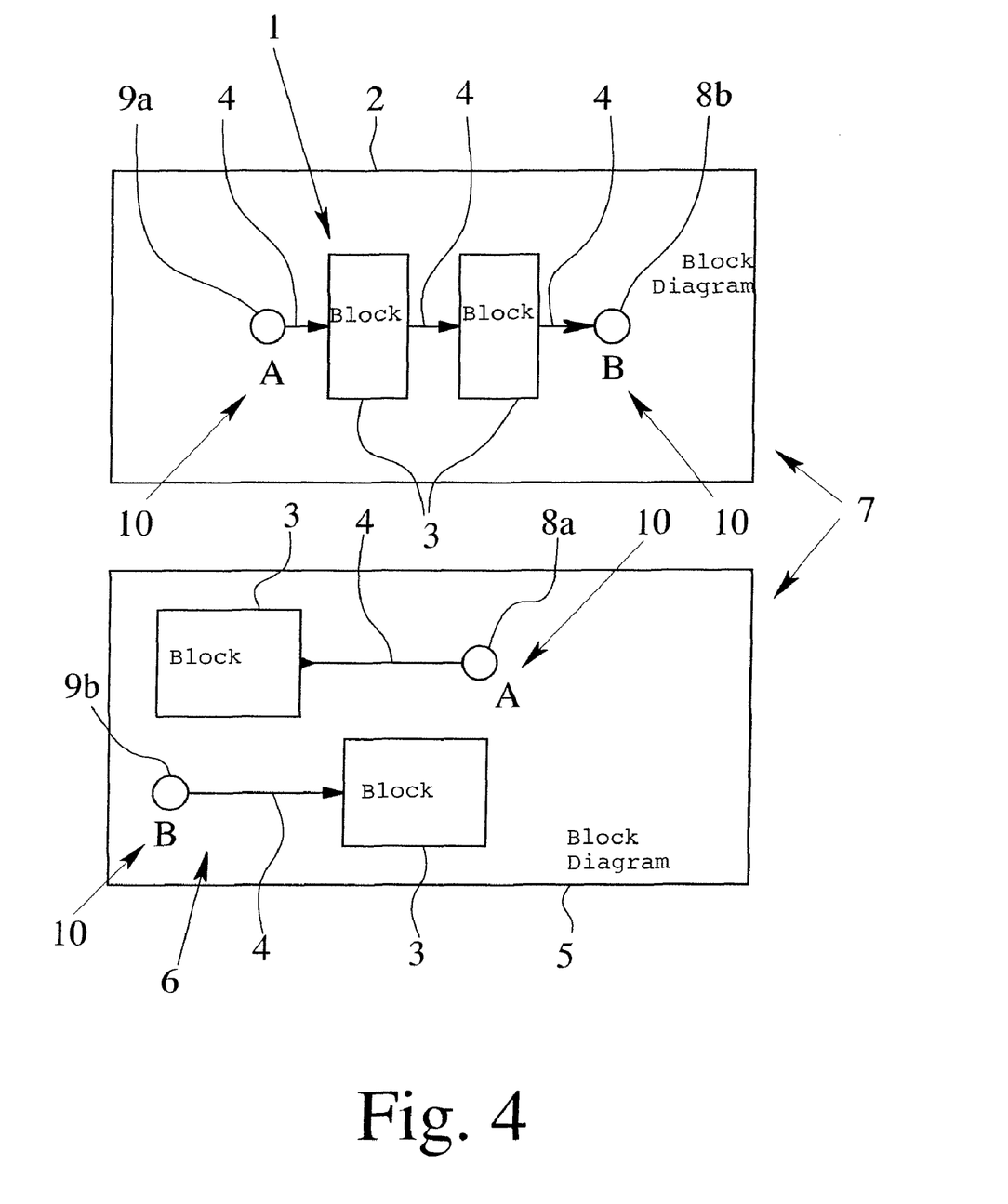
FIG. 4 shows another model or overall block diagram which has been prepared with a preferred embodiment of the modeling means and process as claimed according to the invention.

In the overall block diagram 7 shown in FIG. 4, which has been prepared with a preferred modeling means, the corresponding vertical data transfer means 8, 9; are not assigned to one another by concurrent geometrical positions, but rather by concurrent identifications 10. In the embodiment as shown in FIG. 4, the vertical data transfer means 8a acting as a data source and the corresponding data transfer means 9a acting as the data sink are assigned to one another by the identification 10 using the symbol "A" and accordingly, the corresponding vertical data transfer means 8a and 9b via the identification 10 using the symbol "B".

FIG. 4 shows that, when using concurrent symbolic identifications 10 for the corresponding vertical data transfer means 8, 9, concurrent geometrical positions in the model planes 2, 5 can be eliminated. In a preferred embodiment which is not shown here, the two indicated assignment possibilities of corresponding vertical data transfer means 8, 9—therefore by concurrent geometrical positions or identifications 10—are used in combination.

Figure 3:
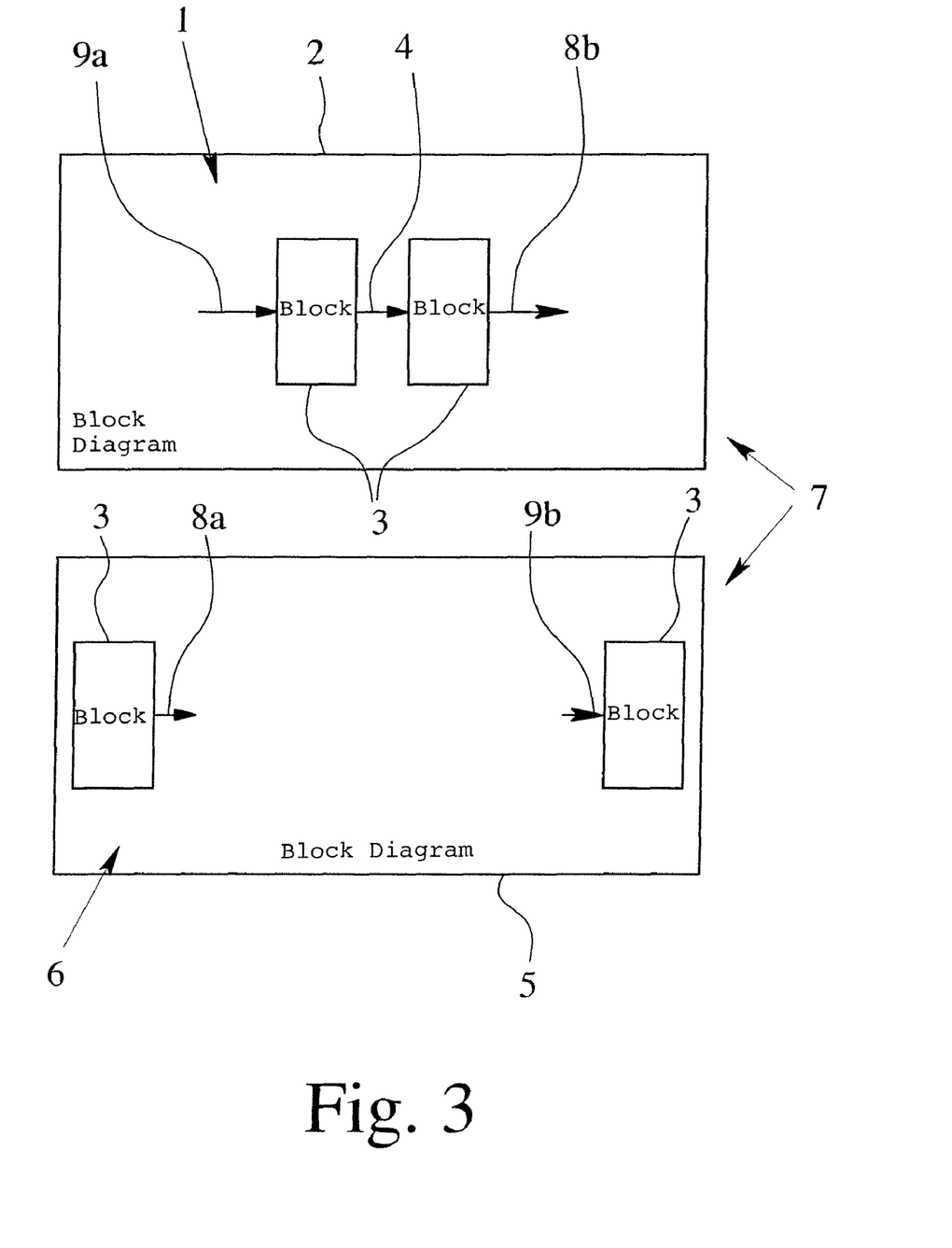
FIG. 3 shows another model or overall block diagram which has been prepared with a preferred embodiment of the modeling means and process of the invention.

In FIGS. 2 & 4 to 6, the vertical data transfer means 8, 9, are always made as vertical data transfer blocks 8, 9; this is especially advantageous for the detectability of the data flow. However, as the embodiment in FIG. 3 shows, the vertical data transfer means 8, 9, can also be made as open-ending or beginning signal lines 4.

The modeling means supports the use of vertical data transfer means 8, 9, with respect to different applications. The block diagrams prepared with different embodiments of the computer-aided modeling means in FIGS. 2 & 4 to 6 each show vertical data transfer means 8, 9, made as circular blocks. In all these cases, the data sent or received by the vertical data transfer means 8, 9, acting as a data source or data sink, can be supplied or picked up via an interface 11a, 11b (FIG. 2). The vertical data transfer means 8, 9, used in this way, thus equally represent a through station for the transferred data.

However, the vertical data transfer means 8, 9, supported by the embodiments of the modeling means used here, can also be used in such a way that the vertical data transfer means 9, which are acting as the data sink, are parameterized only with the received data and without necessarily making them available for further use in the model plane, for example, via a block output. This is an exceptionally important possibility for configuring a vertical data transfer means which is made available by the modeling means and is explained in further detail below using the embodiment shown in FIG. 5.

Figure 7:
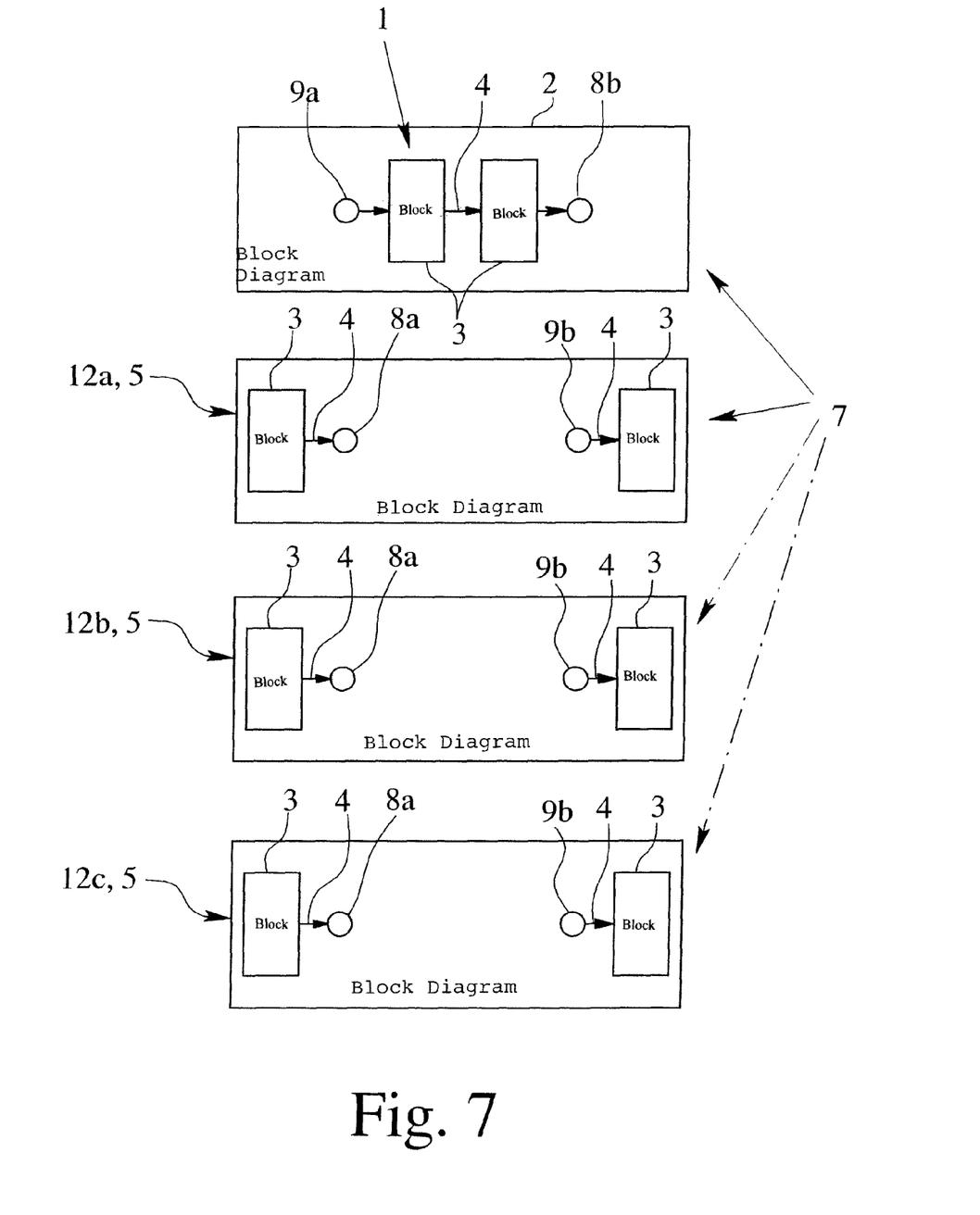
FIG. 7 shows another model or overall block diagram prepared with a preferred embodiment of the modeling means according to the invention and the process according to the invention.

The overall block diagram 7 in FIG. 7 has been prepared with a preferred modeling means which makes it possible to arrange parts of the overall block diagram 7 to be alternatively executed on different alternative model planes 12a, 12b, 12c. In the embodiment shown in FIG. 7, the overall block diagram 7 is comprised of a first model plane 2 and altogether three different versions of another model plane 5, specifically the alternative model planes 12a, 12b, 12c. In this connection, the overall block diagram 7 is composed of the first model plane 2 with only one of the other model planes 5, specifically, either model plane 12a or the alternative model plane 12b or alternative model planes 12c. The modeling means allows activation and deactivation of alternative model planes 12a, 12b, 12c since only one of the alternative model planes 12a, 12b, 12c in combination with the remaining model components forms the overall block diagram 7. In FIG. 7, the alternative model planes 12a, 12b, 12c are used for description of three different device configurations, the input-side blocks 3 in the alternative model planes 12a, 12b, 12c representing different A/D converters and the output-side blocks 3 in the alternative model planes 12a, 12b, 12c representing different D/A converters. In an embodiment which is not shown here, the first model plane 2 is also formed by different alternative model planes 12.

Figure 5:
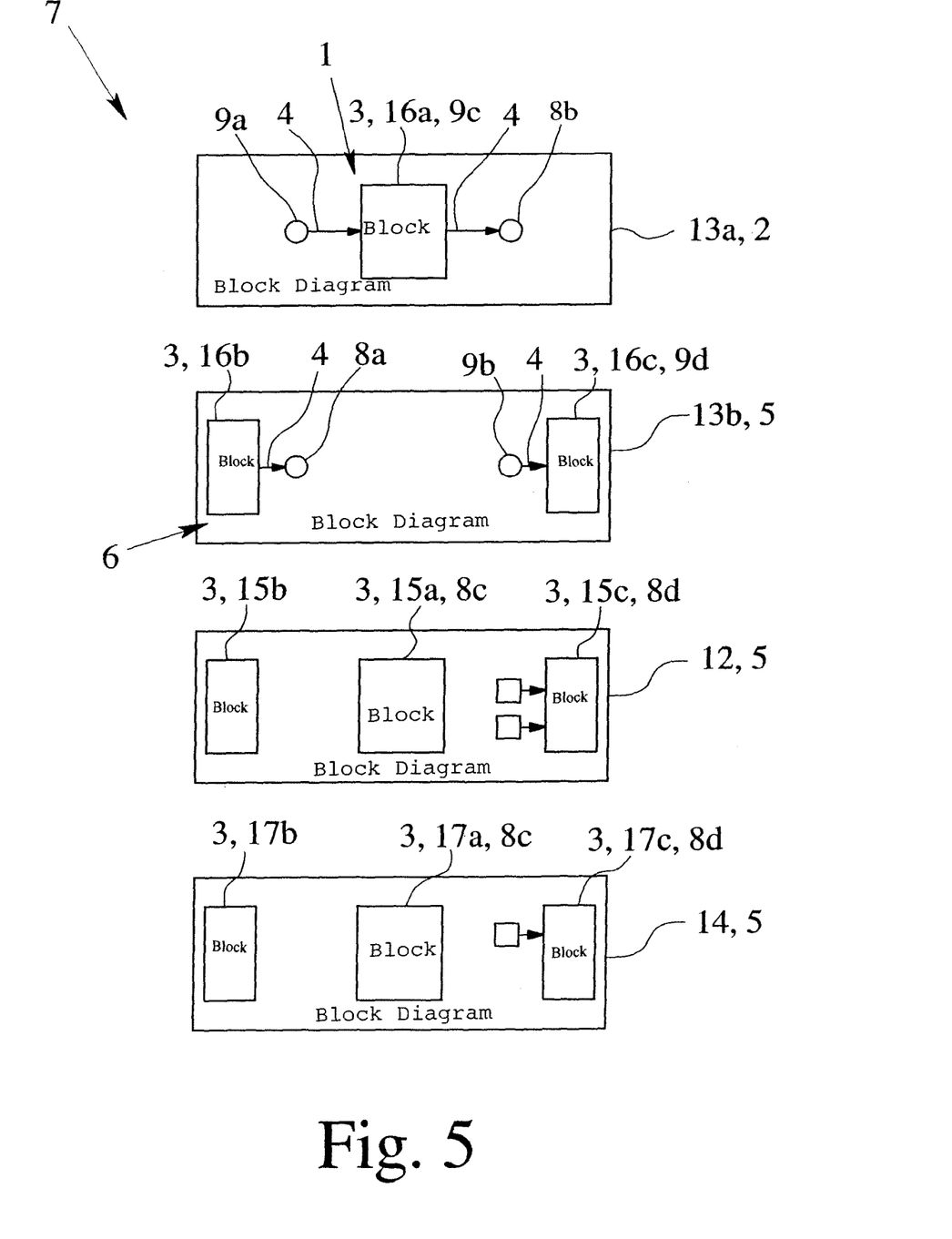
FIG. 5 shows another model or overall block diagram which has been prepared with a preferred embodiment of the modeling means and process in accordance with the invention.

FIG. 5 shows an overall block diagram 7 which has been prepared with a preferred computer-aided modeling means which allows modeling of several operating modes by several model planes 12, 13, 14. The operating mode-model plane 12 is used for modeling of the initialization-operating mode, the operating mode-model planes 13a, 13b are used for modeling of the run time behavior and the operating mode-model plane 14 is used for modeling of the termination behavior.

The first block diagram 1 in the first model plane 2 and the other block diagram 6 in the other model plane 5 represent modeling of the run time behavior in the run time model planes 13a, 13b. The signal flow between the parts of the block diagram which are distributed among the first model plane 2, 13a and the other model plane 5, 13b is produced by the vertical data transfer means 8, 9.

To support the concept of modeling of different operating modes in the operating mode-model planes 12, 13, 14, the preferred modeling means provides blocks 3 comprising operating mode-partial blocks 15, 16, 17 which correspond to the operating modes at the same time. In the embodiment illustrated in FIG. 5, the modeling means automatically assigns the operating mode-partial blocks 15, 16, 17 to the corresponding operating mode-partial planes 12, 13, 14 when using the blocks 3.

The operating mode-partial blocks 15, 16, 17 are formed by the modeling means as vertical data transfer means 8, 9, therefore are provided with the ability to receive data from other model planes 2, 5 of the same abstraction stage from the corresponding operating mode-partial blocks 15a-15c, 17a-17c which are likewise made as vertical data transfer means 8, 9, and to send data to the corresponding operating mode-partial blocks 16a-16c which are likewise made as vertical data transfer means 8, 9.

In FIG. 5, the initialization model plane 12 is used for modeling of the behavior of the overall block diagram 7 at the start of simulation or at the start of the run time. The termination model plane 14 is used to model the termination behavior of the overall block diagram 7, therefore the behavior at the end of the run time of the simulation carried out based on the overall block diagram 7 using the modeling means.

Furthermore, FIG. 5 shows that, in the two complementary run time model planes 13a, 13b, there are operating mode-partial blocks 16a, 16b, 16c which describe the run time behavior. The corresponding other operating mode-partial blocks 11a, 17a, which are located in the initialization model plane 12 and the termination model plane 14, belong to the run time partial block 16a. The run time partial block 16a, in this case, is a PID (Proportional-Integral-Derivative) controller, but it can quite generally have any functionality. The operating mode-partial blocks 15a, 16a, and 17a are also executed as vertical data transfer means 8e, 9c. This means that the parameter values given in the initialization partial block 15a and the termination partial block 17a can be transmitted from the initialization model plane 12 and the termination model plane 14 into the run time model plane 13a to the vertical data transfer block 16a, 9c which acts as a data sink and which is located there.

It is established, for example, by the initialization partial block 15a which initial value the integrator in the PID controller 16a has and it is indicated in the termination partial block 17a which initial value the PID controller 16a is to have at the end of the run time. In this embodiment, the corresponding parameters are input in the operating mode-partial blocks 15a, 17a via dialog windows which can be activated by the known "double clicking" of the operating mode-partial blocks 15a, 17a; but, this is not shown in particular.

The run time partial block 16c which is located in the run time model plane 13b is a block 3 which describes a D/A converter. As is in the previous example, the run time partial block 16c is parameterized by the corresponding operating mode-partial blocks 15c in the initialization model plane 12 and the termination model plane 14. The blocks 15c, 16c and 17c are also made as corresponding vertical data transfer blocks 8d, 9d. In contrast to the previous example, parameter input into the vertical data transfer blocks 15c, 17c, which act as a data source, does not take place via a dialog, but via other blocks which feed the operating mode-partial blocks 15c, 17c.

The overall block diagram 7 prepared with the known modeling that is shown in FIG. 1 comprises a block 3 which is made as a sub-block diagram block 18. The sub-block diagram block 18 represents a sub-block diagram 19 which is located in a sub-block diagram model plane 20. It is important here that the first model plane 2 and the sub-block diagram model plane 20 do not belong to the same abstraction stage, but that the sub-block diagram model plane 20 belongs to a lower abstraction stage than that of the first model plane 2. In practical terms, this means that the sub-block diagram 19 contained in the sub-block diagram model plane 20 is only a different representation—specifically one at a lower abstraction stage—of the sub-block diagram block 18 in the first model plane 2; the sub-block diagram 19 consequently implements the same functionality as the sub-block diagram block 18, only imparting a more detailed way of looking at the question of how the functionality of the sub-block diagram block 18 is implemented using modeling techniques.

Figure 6:
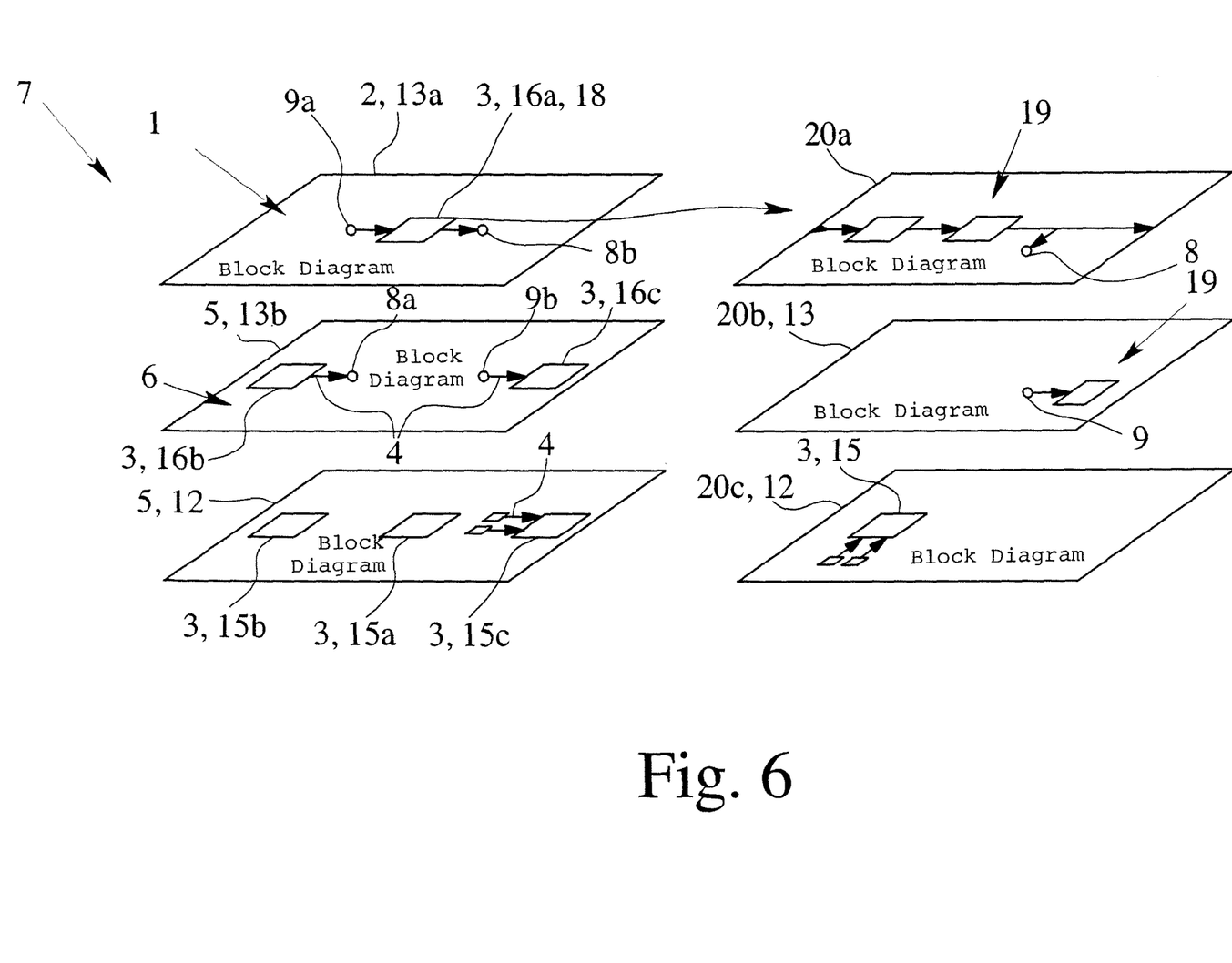
FIG. 6 shows another model or overall block diagram prepared with a preferred embodiment of the modeling means according to the invention and the process according to the invention.

FIG. 6 shows a representation of the first model plane 2 and of the other model planes 5 which differ from FIGS. 2 to 5, the representation being perspective. This special manner of representation in FIG. 6 supports the idea that, within a model plane, "horizontal" data transfer means 4 provide for data exchange between blocks 3, conversely vertical data transfer means 8, 9 provide for data exchange between model planes 2, 5, which are located on top of and underneath one another. However, the computer-aided modeling means allows any representations of the first and other model planes 2, 5. Thus, also representations, as shown in FIGS. 2 to 5, which are not bound to the idea of horizontal and vertical data exchange.

FIG. 6 shows how the method of the sub-block diagram 19, known from the prior art is implemented with one preferred embodiment of a modeling means of the invention. On the left side of FIG. 6, first of all, an overall block diagram 7 is shown which comprises a first model plane 2 and two other model planes 5, one of the other model planes 5—like the first model plane—being made as the run time model plane 13 and the second, other model plane 2 as the initialization model plane 12.

The concept of modeling which is enabled by the modeling means is known in principle from FIG. 5 in a two-dimensional representation. The block 3 which is placed in the first model plane 2 and the first run time model plane 13a is made as a sub-block diagram block 18. This sub-block diagram block 18 is represented in a lower abstraction stage by a sub-block diagram 19 which is represented on at least two, in this example three, sub-block diagram model planes 20a-20c which are different from the model planes 2, 5 of the overall block diagram 7. Here, the sub-block diagram model planes 20a-20c belong to the same, but lower, abstraction stage than the first abstraction stage. To exchange data between the different sub-block diagram model planes 20a-20c, in turn, the corresponding vertical data transfer means 8, 9 are made available by the modeling means for arrangement in the model planes.

The computer-aided modeling means allows, especially an integrated representation of a choice of model planes from the first model plane 2 and the other model planes 5, so that a complete survey of the interaction of the components of the overall block diagram 7, which are distributed among different model planes 2, 5, can be obtained. In one preferred embodiment of a computer-aided modeling means which, however, is not shown here, an integrated representation is achieved by superposing the block diagrams selected from the block diagrams 1, 6 on top of one another. In one preferred embodiment, the computer-aided modeling means automatically enables only noncontradictory selection of model planes from the first model plane 2 and the other model planes 5 to be made.

Figure 8:
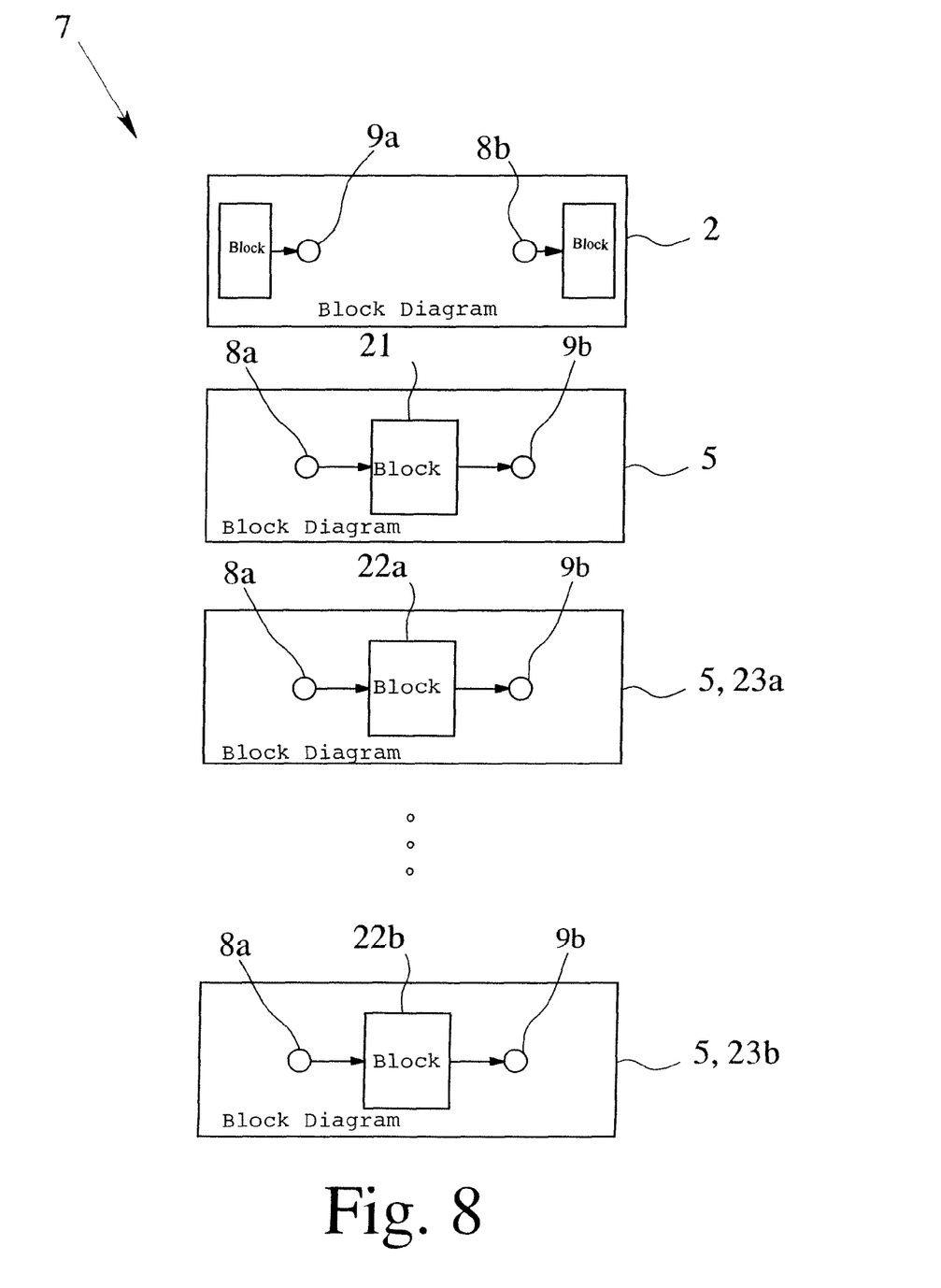
FIG. 8 shows another model or overall block diagram prepared with a preferred embodiment of the modeling means according to the invention and the process according to the invention.

FIG. 8 shows an overall block diagram 7 which has been prepared with the modeling means and which is dynamically variable in its structure—therefore to the run time of the simulation. For modeling such a time-variable system, the modeling means allows arrangement of a meta-block diagram 21 in one of the model planes 2, 5, or also in a sub-block diagram model plane 20; this will be explained using FIG. 11.

In the embodiment shown in FIG. 8 the meta-block diagram 21 is located in the other model plane 5 which is shown underneath the first model plane 2 and which contains the remaining part of the overall block diagram 7. The two upper model planes 2, 5 show in FIG. 8 are the only model planes which are prepared before the run time of the simulation using the modeling means; the other model planes 5 which are shown in FIG. 8 and which contain the instances 22a, 22c of the meta-block diagram 21—therefore, the instance model planes 23a and 23b—are prepared by the modeling means only for the run time of the simulation, and depending on the simulation run are optionally also destroyed again. Instances 22a, 22b and the instance model planes 23a, 23b are in any case in FIG. 8 not produced manually by the user with the modeling means. However, this is not a general limitation of the modeling means. The modeling means also equally allows the overall block diagram to be provided with a fixed number of instances 22 of the meta-block diagram 21 which are therefore a fixed component of the overall block diagram 7 which is not dependent on the run time.

As known from the preceding embodiments, information exchange between the model planes 2, 5 is guaranteed by vertical data transfer means 8, 9 which appear in FIG. 8 using circular symbols. This also applies to the instance model planes 23a and 23b which belong to the same abstraction stage as the model plane 5 on which the pertinent meta-block diagram 21 is located.

In FIG. 8 the meta-block diagram 21 generally represents a model part which is possibly not a component of the model at all during the simulation run, but which can also be a component of the overall block diagram 7 in a plurality of instances 22. In this specific case of a telematic application the meta-block diagram 21 represents for example an object which has been detected in a monitoring space. If in this specific case during the simulation run in the assumed monitoring space no object is detected, nor does the modeling means produce any instance 22 of the meta-block diagram 21 or the instances 22 produced before are removed again from the model together with the instance model planes 23. If during the simulation run again other objects are detected in the monitoring space, the modeling means produces a corresponding number of instances 22 of the meta-block diagram 21 and adds them dynamically to the model. In the embodiment shown in FIG. 8 each instance 22 is located in a separate instance model plane 23a, 23b.

Figure 9:
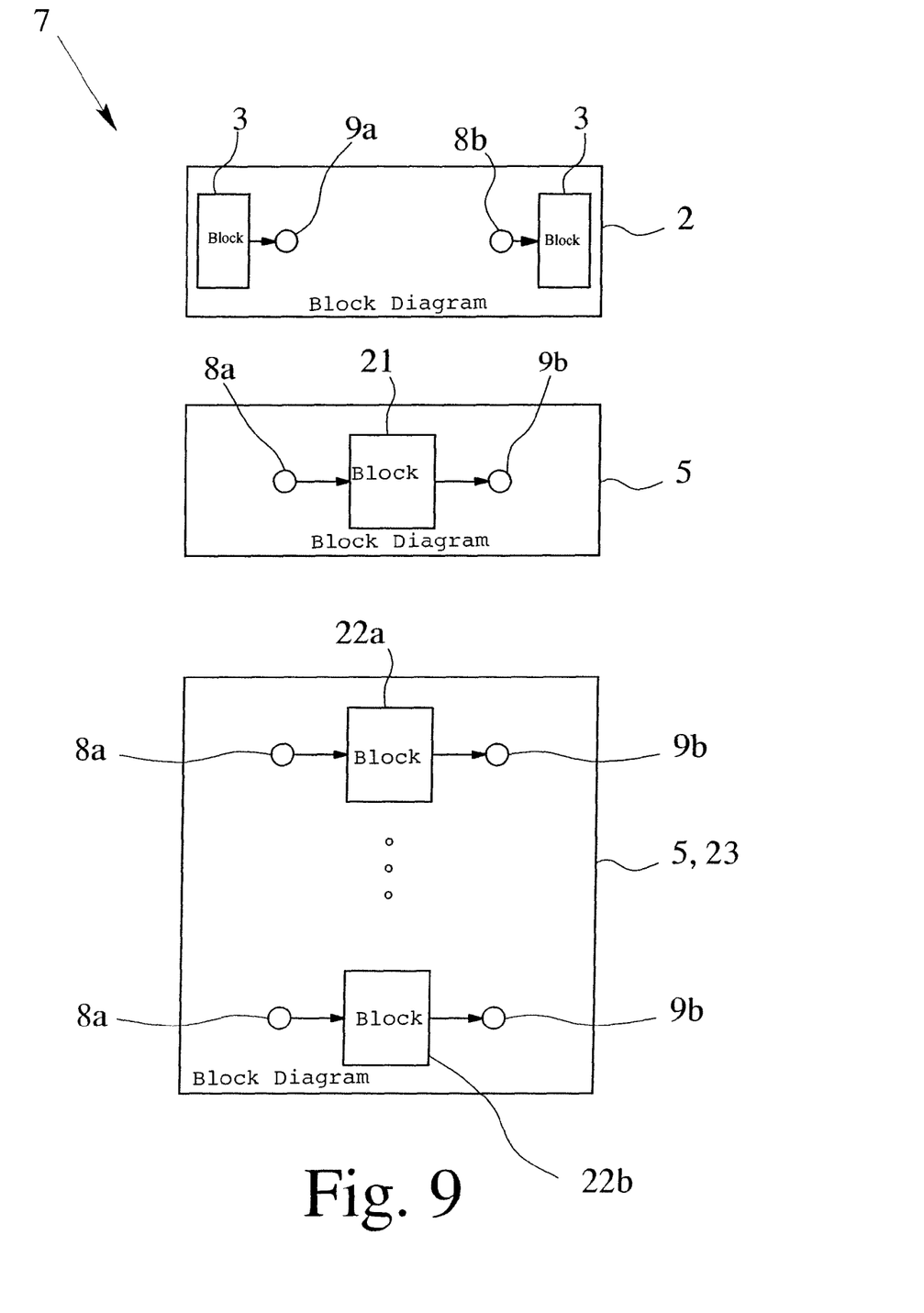
FIG. 9 shows another model or overall block diagram prepared with a preferred embodiment of the modeling means according to the invention and the process according to the invention.

The embodiment according to FIG. 9 differs from the one in FIG. 8 only in that the instances 22a, 22b of the meta-block diagram 21 are located solely in a single common instance model plane 23.

Figure 10:
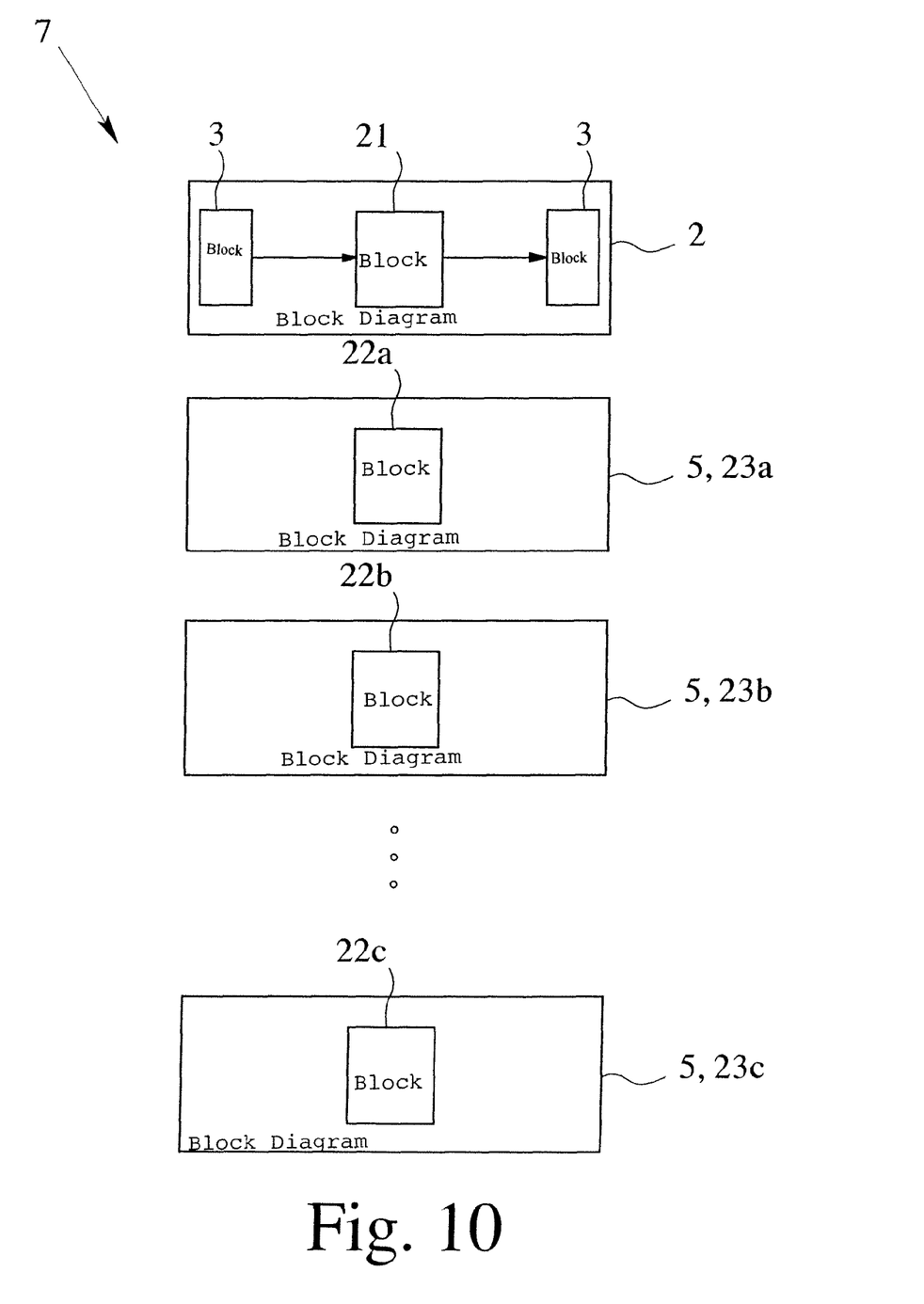
FIG. 10 shows another model or overall block diagram prepared with a preferred embodiment of the modeling means according to the invention and the process according to the invention.

The embodiment in FIG. 10 illustrates that the meta-block diagram 21 with all other model components existing before the run time of the simulation can be located in a single model plane 2, therefore, it is in no case necessary to separate the meta-block diagram 21 in another model plane. For the run time of the simulation the modeling means then produces the instances 22a, 22b, 22c depending on the simulation run, as described above, and places them in the instance model planes 23a, 23b, 23c.

It was pointed out initially that the vertical data transfer means ensure the data flow between model planes of the same abstraction stage, the appearance of the data transfer means however can be entirely different and the appearance is dependent on the possibilities of the modeling environment and software environment, with which the process according to the invention or the modeling means according to the invention is implemented. It has also been pointed out that the data transfer means need not appear explicitly for the viewer of an overall block diagram, the functionality of the data transfer means rather can be incorporated in the blocks of the overall block diagram. This is also the behavior with the embodiment shown in FIG. 10 in which the instances 22a, 22b, 22c are not connected among one another and to the meta-block diagram 21 or the other blocks 3 of the overall block diagram 7 via visually perceptible data transfer means, although the instances 22a, 22b, 22c and the meta-block diagram 21 internally have this functionality.

Figure 11:
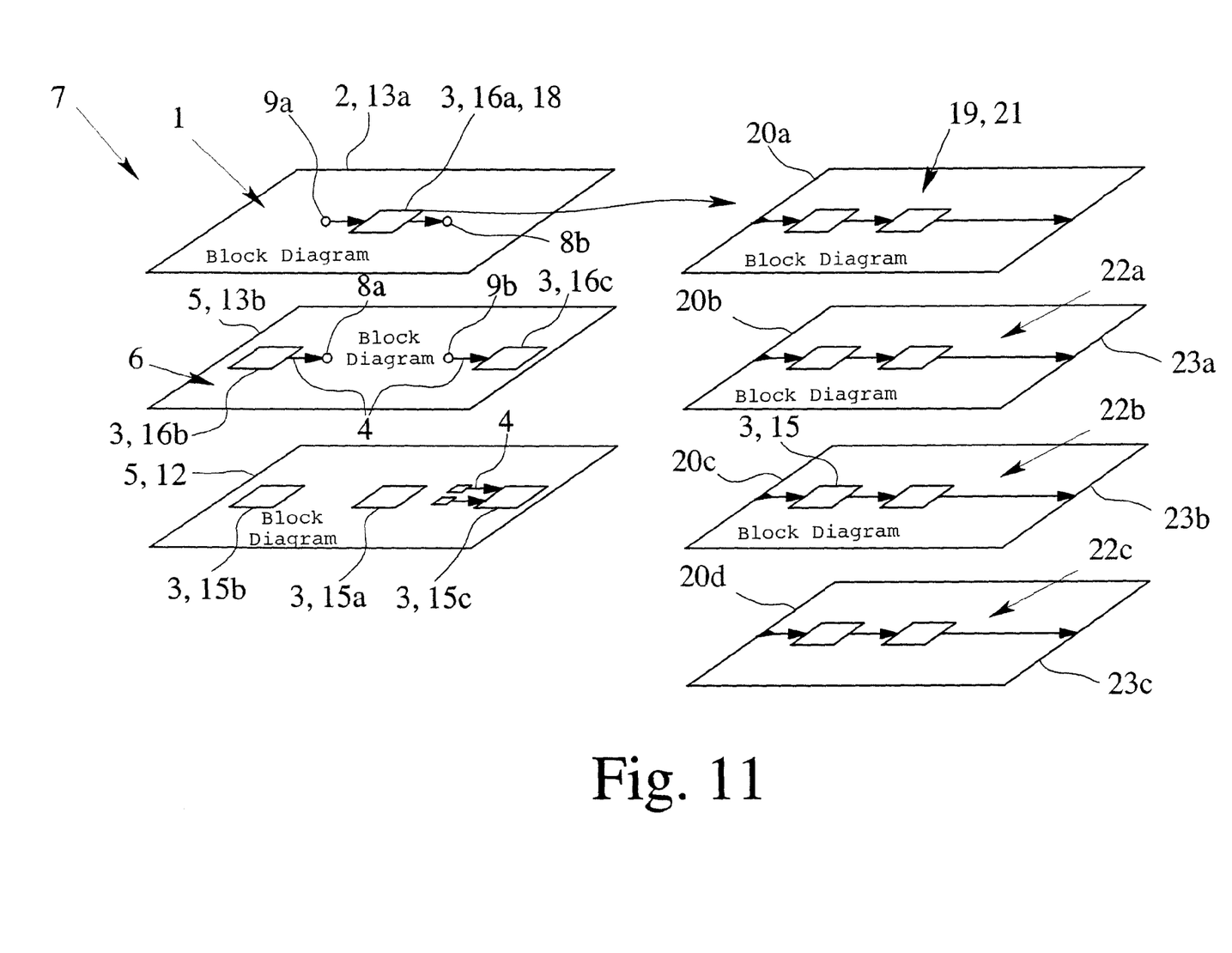
FIG. 11 shows a last example of a model or overall block diagram prepared with a preferred embodiment of the modeling means according to the invention and the process according to the invention.

The embodiment in FIG. 11 shows that the concept of run time-variable models based on meta-block diagrams 21 and their instances 22 can be easily combined with the idea of implementation of sub-block diagrams 19 and sub-block diagram model planes 20 according to the invention, as has been described already using FIG. 6. The sub-block diagram block 18 located in the first model plane 2 contains in this connection as the sub-block diagram 19 the meta-block diagram 21 which is shown as the contents of the sub-block diagram block 18 in the sub-block diagram model plane 20a. The instances 22a, 22b, 22c and the instance model planes 23a, 23b, 23c are only produced by the modeling means for the run time of the simulation and optionally also are removed again depending on the simulation run.

The block diagrams 1, 6, 7 which were produced in FIGS. 2 to 11 by preferred embodiments of a modeling means equally describe embodiments of a corresponding process for computer-aided, block-based modeling for preparation of block diagrams, the process under consideration being characterized by process features which correspond to the described features of the modeling means. Therefore, a separate description of the claimed process using FIGS. 1 to 11 is unnecessary and has been omitted.

It goes without saying that different features of the modeling means according to the invention and the process according to the invention which have been described using the figures can also be combined with one another, even of they have not been shown and described in combination here.

What is claimed is:

1. Process for computer-aided, block-based modeling, comprising the steps of:
   preparing a first block diagram in a first model plane which relates to a first abstraction stage, the first block diagram having at least two blocks which are connected to one another by horizontal data transfer means for horizontal exchanging of data therebetween,
   preparing at least a second model plane which relates to said first abstraction stage, which is separated from the first model plane and which has at least one other block diagram,
   forming an overall block diagram from the first block diagram of the first model plane and the other block diagram of at least the second model plane, and
   connecting the first model plane and at least said second model plane by corresponding vertical data transfer means for vertical exchange of data therebetween,
   wherein the parts of the overall block diagram to be alternatively executed are located on different alternative model planes, and the alternative model planes can if necessary be activated and deactivated.

2. Process for computer-aided, block-based modeling, comprising the steps of:
   preparing a first block diagram in a first model plane which relates to a first abstraction stage, the first block diagram having at least two blocks which are connected to one another by horizontal data transfer means for horizontal exchanging of data therebetween,
   preparing at least a second model plane which relates to said first abstraction stage, which is separated from the first model plane and which has at least one other block diagram,
   forming an overall block diagram from the first block diagram of the first model plane and the other block diagram of at least the second model plane, and
   connecting the first model plane and at least said second model plane by corresponding vertical data transfer means for vertical exchange of data therebetween,
   wherein at least one meta-block diagram is arranged in at least one model or sub-block diagram model plane of the overall block diagram, the meta-block diagram representing a part of the overall block diagram which can be at least easily produced or destroyed for the run time, from the meta-block diagram for the run time at least one instance is produced and the instance is arranged in at least one instance model plane.

3. Process as claimed in claim 2, wherein the instance-model plane is produced and destroyed synchronously with the instance of the meta-block diagram for the run time, especially so many instance model planes are produced/destroyed that each instance of the meta-block diagram produced can be placed in a separate instance model plane.

4. Process as claimed in claim 2, wherein at least one of the local and global data elements are defined in the meta-block diagram, the local data elements existing without interactions for each instance model plane separately next to one another and the global data elements for all instance model planes being identical.

5. Process as claimed in claim 2, wherein the development—origination and deletion—of the instance model planes for the run time is at least one of displayed and protocolled.

6. Modeling means for preparation of a first block diagram in a first model plane relating to a first abstraction stage, comprising:
   at least two blocks which are placeable in a first model plane,
   horizontal data transfer means connecting said blocks for horizontal exchange of data therebetween,
   at least one other block diagram which is arrangeable on at least one other model plane which relates to the first abstraction stage and which is separated from the first model plane, so that a first block diagram of the first model plane and the at least one other block diagram of the other model plane form an overall block diagram, and
   corresponding vertical data transfer means which are arrangeable on a selection of at least two model planes from the first model plane and other model planes for producing a vertical exchange of data between the model planes selected,
   wherein parts of the overall block diagram to be alternatively executed are arrangeable on different alternative model planes, and the alternative model planes are activatable deactivatable as necessary.

7. Modeling means as claimed in claim 6, wherein at least one of local data elements and global data elements is definable in the meta-block diagram, the local data elements existing without interactions for each instance model plane separately next to one another and the global data elements for all instance model planes being identical.

8. Modeling means for preparation of a first block diagram in a first model plane relating to a first abstraction stage, comprising:
   at least two blocks which are placeable in a first model plane,
   horizontal data transfer means connecting said blocks for horizontal exchange of data therebetween,
   at least one other block diagram which is arrangeable on at least one other model plane which relates to the first abstraction stage and which is separated from the first model plane, so that a first block diagram of the first model plane and the at least one other block diagram of the other model plane form an overall block diagram, and
   corresponding vertical data transfer means which are arrangeable on a selection of at least two model planes from the first model plane and other model planes for producing a vertical exchange of data between the model planes selected,
   wherein at least one meta-block diagram can be arranged in at least one model or sub-block diagram model plane of the overall block diagram, the meta-block diagram representing a part of the overall block diagram which can be at least easily produced or destroyed for the run time, from the meta-block diagram for the run time at least one instance can be produced and the instance can be arranged in at least one instance model plane.

9. Modeling means as claimed in claim 8, wherein the instance model plane can be produced and destroyed synchronously with the instance of the meta-block diagram for the run time, especially so many instance-model planes can be produced or destroyed that each instance of the meta-block diagram produced can be placed in a separate instance model plane.

10. Modeling means as claimed in claim 8, wherein the development—origination and deletion—of the instance model planes for the run time can be displayed and/or protocolled.

* * * * *